United States Patent
Abdelghani et al.

(10) Patent No.: US 6,618,234 B1
(45) Date of Patent: Sep. 9, 2003

(54) LIGHTNING PROTECTION FOR IRRIGATION CONTROLS

(75) Inventors: Ali Abdelghani, Monrovia, CA (US); Uzair Siddiqui, Stevenson Ranch, CA (US); Derek A. Harris, Grand Terrace, CA (US); Lam Mau Nguyen, Fountain Valley, CA (US); Arnold Ray Nelson, Redlands, CA (US); Michael Larry Bell, Yucaipa, CA (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 09/658,378

(22) Filed: Sep. 8, 2000

(51) Int. Cl.[7] ............................................. H02H 9/00
(52) U.S. Cl. ..................... 361/117; 361/118; 361/127
(58) Field of Search .................... 361/117, 118, 361/119, 120, 124, 127; 239/68, 310, 339, 206, 238, 69; 137/93, 624; 364/145, 420

(56) References Cited

U.S. PATENT DOCUMENTS

| | | | |
|---|---|---|---|
| 3,448,337 A | 6/1969 | Kawiecki | |
| 3,538,382 A | 11/1970 | Smith, Jr. | |
| 3,656,024 A * | 4/1972 | Davis | 361/13 |
| 4,215,382 A * | 7/1980 | Davis | 361/166 |
| 4,827,155 A | 5/1989 | Firebaugh | |
| 4,845,580 A | 7/1989 | Kitchens | |
| 4,907,120 A | 3/1990 | Kaczmarek et al. | |
| 5,272,588 A | 12/1993 | Motoori | |
| 5,278,720 A | 1/1994 | Bird | |
| 5,369,626 A * | 11/1994 | Carroll | 367/188 |
| 5,379,177 A | 1/1995 | Bird | |
| 5,594,613 A | 1/1997 | Woodworth et al. | |
| 5,623,388 A | 4/1997 | Chaudhry | |
| 5,768,084 A | 6/1998 | Chaudhry et al. | |
| 5,790,363 A | 8/1998 | Chaudhry | |
| 5,796,570 A | 8/1998 | Mekdhanasarn et al. | |
| 6,225,560 B1 * | 5/2001 | Machado | 174/52.2 |

* cited by examiner

Primary Examiner—Stephen W. Jackson
Assistant Examiner—James A. Demakis
(74) Attorney, Agent, or Firm—Stout, Uxa, Buyan & Mullins, LLP

(57) ABSTRACT

Damage to electronic golf course sprinkler valve controls from lightning current surges is prevented by electrically isolating the actual valve control circuit from the logic circuitry that controls it, using in the valve control circuit only components and printed traces that can withstand at least as much power dissipation as the field wiring, and grounding each valve control individually to earth ground through a plasma discharge device.

5 Claims, 2 Drawing Sheets

LIGHTNING PROTECTION FOR IRRIGATION CONTROLS

FIELD OF THE INVENTION

This invention relates to irrigation controls, and more specifically to control circuitry that is impervious to current surges induced by lightning strikes in the field wiring.

BACKGROUND OF THE INVENTION

Irrigation systems such as, for example, sprinkler systems on a golf course, are often operated from a central location at which a complex computer- or microprocessor-driven control apparatus controls a large number of sprinkler valves out on the golf course.

Because the valve control wiring runs for considerable distances at a shallow depth underground in open terrain, it is subject to sharp induced current spikes or surges from lightning strikes in thunderstorm-prone areas. This does not normally pose a problem for the wiring and the valves in the field because they are sufficiently robust to withstand even a strong current surge for the few microseconds' duration of a lightning strike. The problem arises, however, in the much more delicate electronics of the central control equipment, in which control transistors, circuit board traces, and other components can be damaged or destroyed by a strong surge in the few microseconds before protective devices can react.

SUMMARY OF THE INVENTION

The present invention protects the control electronics from lightning surge damage by electrically isolating the valve actuating circuitry from the control logic circuitry and configuring the actuating circuitry as a low-impedance path that is mechanically strong enough to withstand the power dissipation from a lightning surge in the few microseconds before a protective plasma device can fire.

DESCRIPTION OF THE PREFERRED EMBODIMENT

Figure 1:
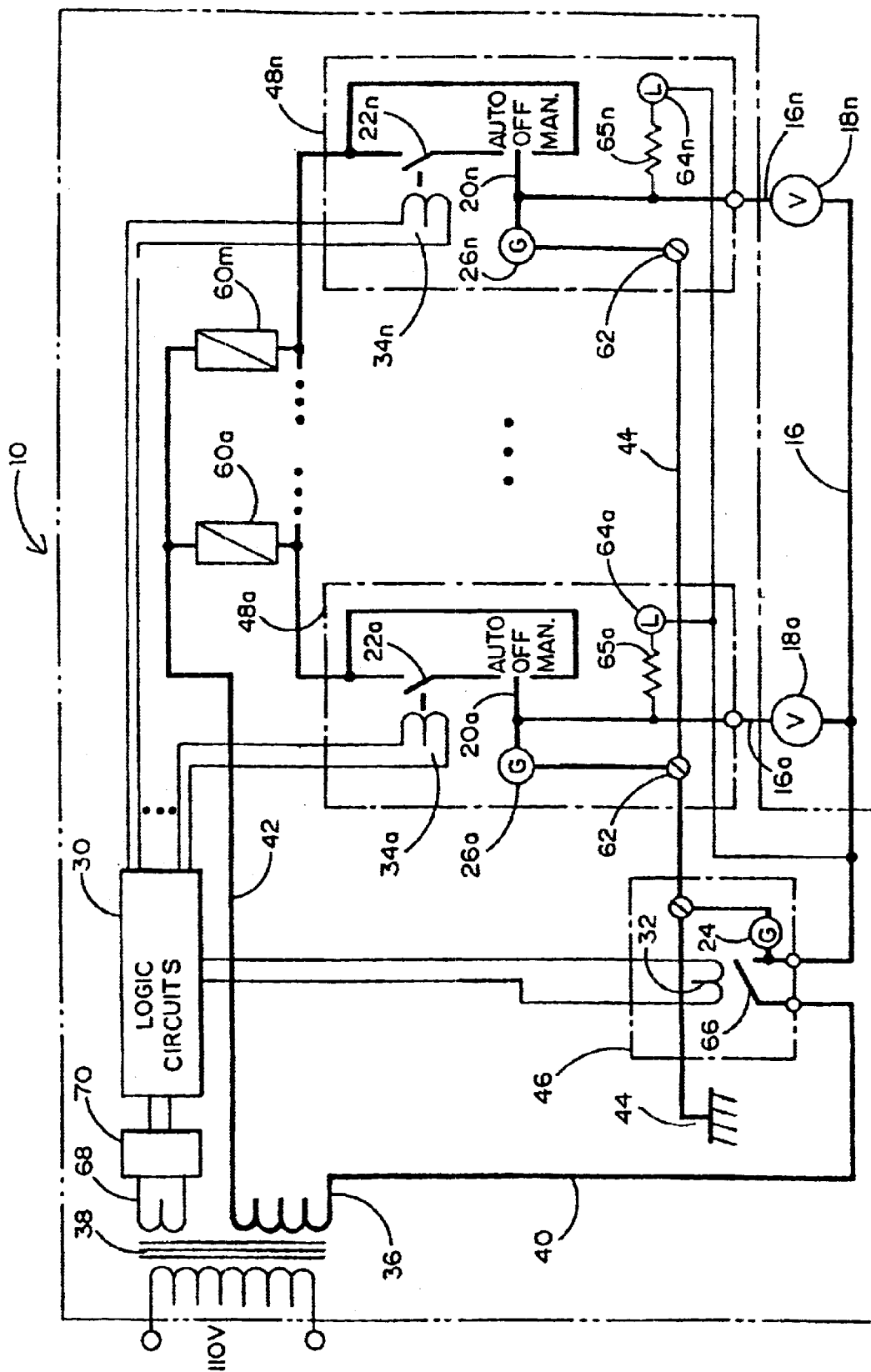
FIG. 1 is a circuit diagram, partly in block form, showing the circuit of the invention.

It has been conventional for some time to protect electric circuits against lightning surges by grounding them to earth ground through a plasma device commonly referred to as a gas pill. The gas pill contains a gas that instantaneously ionizes when the voltage across the pill exceeds a rated breakdown voltage. The ionized gas then forms a path of essentially zero impedance and thereby provides a short to ground with a very high current-carrying capacity.

Although gas pills should theoretically prevent any lightning surge damage to the circuits they protect, practical experience has shown that this is not always so. The reason for this problem is that even though lightning surges occur in the microsecond range and gas pills ionize in nanoseconds once a critical potential is reached, there is a finite time during which circuit elements can be exposed to destructive amounts of power before the voltage across the gas pill reaches the firing level. This is so because during a lightning surge, different voltages and currents can be induced in different parts of the circuit.

For purposes of explaining this phenomenon, each valve control circuit in the water valve control circuit 10 of FIG. 1, which is discussed in more detail below, can be described symbolically as a loop 12 (FIG. 2) that is isolated from, but in physical proximity to, an earth ground 14. A lightning strike in the vicinity of the field wiring 16 that connects the control circuitry 12 to the sprinkler valve relays 18 on the golf course induces a high voltage with respect to the earth ground 14 in the loop 12. Because of arcing and differences in the physical location of circuit components with respect to earth ground, the induced voltage is different at different points in the loop 12. For, example, a substantial voltage difference may exist between the field wiring 16 and the switch and relay locations 20, 22 on the loop 12 so as to cause a current to flow through the loop 12 including its wiring, circuit board traces and components.

This current flows only until the gas pills 24, 26 fire and effectively short the loop 12 to earth ground 14. During that period, measured in microseconds, enough current can flow, however, to exceed the heat dissipation capability of conventional printed circuit traces or other delicate components. For example, if the gas pills fire at 100 V and the loop resistance is 0.01 ohms/foot (which corresponds roughly to 20 AWG wire), a surge building up to 100 V in 1 microsecond will dissipate about 1 joule of energy per foot of circuit before the gas pills fire.

Relay contacts, switch contacts, field wiring cables and valve solenoids can typically absorb this level of energy for the few microseconds that may elapse before the gas pills 24, 26 fire, even though open contacts will arc over. Electronic components and conventional printed; circuit board traces, however, often cannot.

Figure 2:
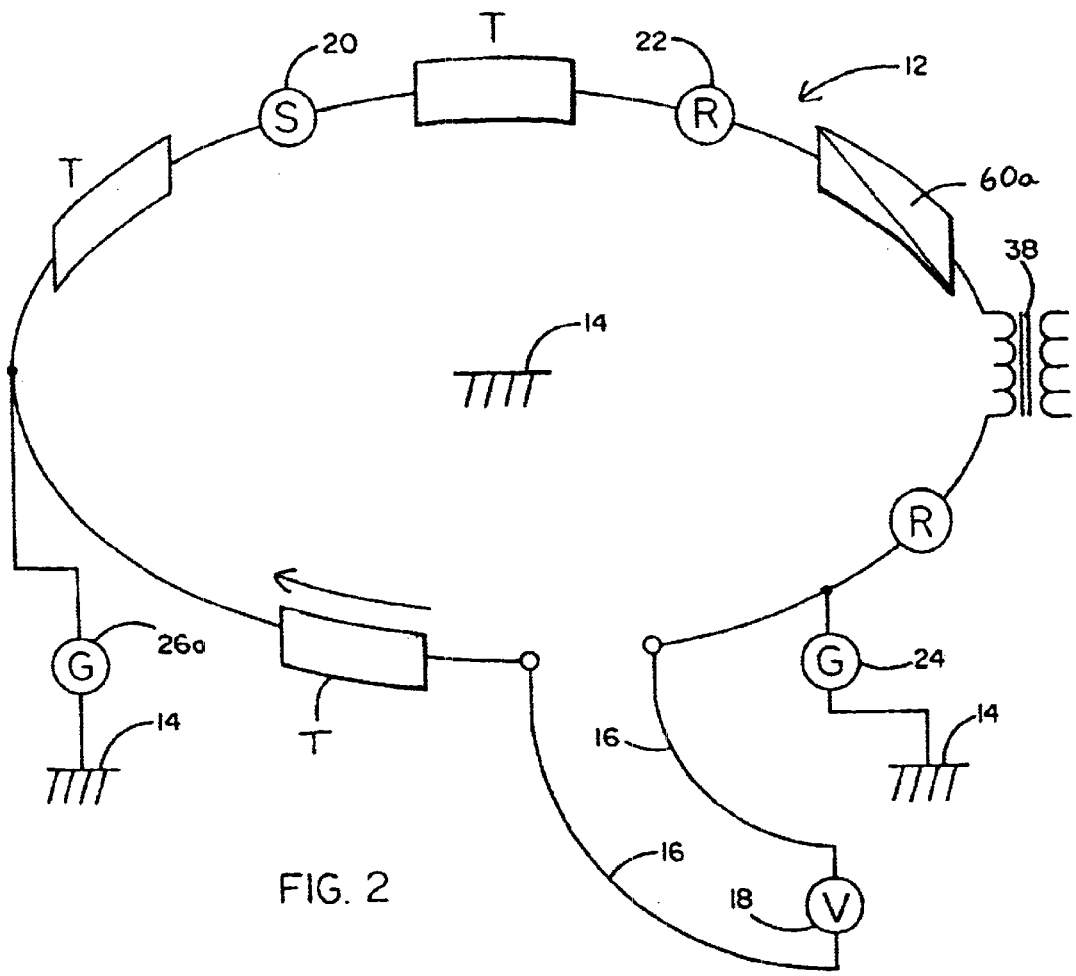
FIG. 2 is a stylized circuit diagram showing the parameters involved in the invention.

In accordance with the invention, the circuit 10 of FIG. 1 maintains the logic circuit 30 and relay coils 32 and 34a–n electrically isolated from the valve operating circuitry. The valve operating circuitry of FIG. 1 includes the winding 36 of the power transformer 38, the common (i.e. circuit return) bus bar 40, the "hot " bus bar 42, the earth ground bus bar 44, and master or pump control board 46, the valve control boards 48a through 48n, the field wiring 16 and 16a–n, and the sprinkler valve solenoids 18a through 18n.

Each of the valve control boards 48a–48n includes one of the relays 22a–n controlled by the logic circuitry 30 in accordance with a preset program or remotely originated commands. The relays 22a–n turn selected valves 18a–n on and off as needed. This cannot be done in the inventive circuit by the conventional triac semiconductor switches because these feed back into the logic boards and defeat the isolation of the valve operating circuitry. In addition, the boards 48a–n each contain a three-position switch 20a–n connected to allow selection of automatic or manual operation of a corresponding valve 18a–n. Fuses 60a–m (preferably one for every eight of the valves 18a–n) are provided to cope with short circuits during normal operation. Each of the valves 18a–n is also provided with a gas pill 26a–n that is connected to the earth ground bus 44 through a high-current, low-impedance path such as a screw 62.

In the inventive circuit 10, the AC valve operating circuitry (shown in dark lines in FIG. 1) that is electrically connectable to the field wiring 16 and 16a–n is composed exclusively of bus bars, oversized printed circuit board traces T (FIG. 2), and electrically rugged components such as relay contacts, switches and fuses. It will be noted that the valve control boards 48a–n do contain light-emitting diodes (LEDs) 64a–n that function as indicator lights. These LEDs, however, are connected in series with large (e.g. 3000 ohm) resistors 65. Because this resistance is vastly greater than the impedance of the parallel circuit through switches 20a–n and the contacts of relays 22a–n, even when the switch and relay contacts are open and arcing, essentially none of the lightning surge current goes through the LEDs 64a–n. Because the circuit board traces T are the most vulnerable elements of the circuit and the most difficult to check and repair, the cross-sectional area of the circuit board traces should be at least equal to the cross-sectional area of the field wiring. Preferably, it should be larger, e.g. 0.003225 square inches, which corresponds to 14 AWG wire.

As mentioned above, the DC logic circuitry 30 which drives the relays 66 and 22a–n through the relay coils 32 and 34a–n is electrically isolated from the valve operating circuitry. The logic circuitry 30 has its own power supply from a separate secondary winding 68 on the isolation transformer 38, and any surges induced therein by winding 36 can be readily dealt with by a conventional AC-to-DC power supply converter 70.

Figure 3:
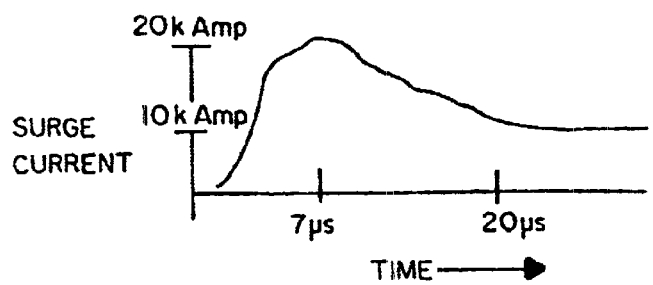
FIG. 3 is a time-amplitude diagram of a typical lightning, surge current.

FIG. 3 illustrates the current potentially induced by a lightning strike. Lightning in nature can cause surge currents to go as high as 20 kA into a 1 ohm-impedance with a rise time of up to 7 us.

Although the master or pump relay board 46 and all the valve control boards 48a–n are protected by gas pills 24 and 26a–n, some of the gas pills may see a sufficient voltage spike to fire and some may not; or they may not fire simultaneously. Thus, potential differences potentially destructive to semiconductors and printed circuit boards may momentarily exist between various points in the valve control circuitry of FIG. 1.

It is understood that the exemplary lightning protection for irrigation controls described herein and shown in the drawings represents only a presently preferred embodiment of the invention. Indeed, various modifications and additions may be made to such embodiment without departing from the spirit and scope of the invention. Thus, other modifications and additions may be obvious to those skilled in the art and may be implemented to adapt the present invention for use in a variety of different applications.

We claim:

1. A lightning-resistant irrigation control system, comprising:
    a) a non-earth-grounded field wiring circuit exposed to induced lightning surges;
    b) an AC valve operating circuit arranged to selectively apply operating power to said field wiring circuit, said valve operating circuit including control components including first portions forming a part of said valve operating circuit, and second portions operating said first portions but being electrically isolated therefrom;
    c) voltage-sensitive plasma discharge devices connecting said valve operating circuit to earth ground;
    d) DC logic circuitry arranged to operate said second portions of said control components;
    e) said logic circuitry being electrically isolated from said valve operating circuit; and
    f) all parts of said valve operating circuit being capable of withstanding a maximum expected lightning surge current for the period of time between the onset of said surge current and the firing of said plasma discharge devices.

2. The system of claim 1, in which said valve operating circuit includes a plurality of valve control boards each containing a relay whose contacts are electrically part of said valve operating circuit but whose coil is part of said logic circuitry, only said valve operating circuit on each of said valve control boards being grounded to earth ground through a plasma discharge device.

3. The system of claim 1, in which said valve operating circuit includes printed circuit traces, said printed circuit traces of said valve operating circuit having a cross-sectional area at least substantially equal to the cross-sectional area of the wiring of said field wiring circuit.

4. The system of claim 1, in which said valve operating circuit is powered through a transformer, and said logic circuitry is powered by an AC-to-DC converter connected to a separate winding of said transformer.

5. The system of claim 1, in which said valve operating circuit is connected to earth ground through said plasma discharge devices adjacent each junction between said valve operating circuit and said field wiring circuit.

* * * * *

UNITED STATES PATENT AND TRADEMARK OFFICE
CERTIFICATE OF CORRECTION

PATENT NO. : 6,618,234 B1
DATED : September 9, 2003
INVENTOR(S) : Abdelghani et al.

It is certified that error appears in the above-identified patent and that said Letters Patent is hereby corrected as shown below:

<u>Title page,</u>
Item [*] Notice, delete the phrase "by 0 days" and insert -- by 414 days --

Signed and Sealed this

Fifth Day of October, 2004

JON W. DUDAS
*Director of the United States Patent and Trademark Office*